United States Patent
Takahashi et al.

(10) Patent No.: US 11,499,042 B2
(45) Date of Patent: Nov. 15, 2022

(54) FOAMED RESIN OBJECT

(71) Applicant: SEKISUI CHEMICAL CO., LTD., Osaka (JP)

(72) Inventors: Katsunori Takahashi, Shiga (JP); Juichi Fukatani, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 196 days.

(21) Appl. No.: 16/756,176

(22) PCT Filed: Jul. 5, 2018

(86) PCT No.: PCT/JP2018/025475
§ 371 (c)(1),
(2) Date: Apr. 15, 2020

(87) PCT Pub. No.: WO2019/092917
PCT Pub. Date: May 16, 2019

(65) Prior Publication Data
US 2020/0277483 A1    Sep. 3, 2020

(30) Foreign Application Priority Data

Nov. 10, 2017 (JP) .............................. JP2017-217413

(51) Int. Cl.
| | | |
|---|---|---|
| *C08L 29/14* | (2006.01) | |
| *C08J 9/10* | (2006.01) | |
| *C08K 5/00* | (2006.01) | |
| *C08K 5/11* | (2006.01) | |

(52) U.S. Cl.
CPC .............. *C08L 29/14* (2013.01); *C08J 9/103* (2013.01); *C08K 5/0016* (2013.01); *C08K 5/0025* (2013.01); *C08K 5/11* (2013.01); *C08J 2201/026* (2013.01); *C08J 2205/06* (2013.01); *C08J 2329/14* (2013.01); *C08L 2203/14* (2013.01)

(58) Field of Classification Search
CPC ....... C08L 29/14; C08L 2203/14; C08J 9/103; C08J 2201/026; C08J 2205/06; C08J 2329/14; C08J 2203/04; C08J 9/0023; C08J 9/00; C08J 9/06; C08K 5/0016; C08K 5/0025; C08K 5/11
See application file for complete search history.

(56) References Cited

U.S. PATENT DOCUMENTS

| | | | | |
|---|---|---|---|---|
| 2,532,241 | A | * | 11/1950 | Ott .......................... C08J 9/106 521/149 |
| 2008/0064775 | A1 | | 3/2008 | Wheeler et al. |
| 2016/0159048 | A1 | | 6/2016 | Ukidwe et al. |
| 2019/0127544 | A1 | | 5/2019 | Takahashi |

FOREIGN PATENT DOCUMENTS

| | | |
|---|---|---|
| CN | 102382406 | 3/2012 |
| EP | 2 303 944 | 4/2011 |
| EP | 3 489 286 | 5/2019 |
| JP | 62-59640 | 3/1987 |
| JP | 2007-536440 | 12/2007 |
| JP | 2010-100778 | 5/2010 |
| JP | 2012-140509 | 7/2012 |
| JP | 2015-52726 | 3/2015 |
| WO | 2005/116325 | 12/2005 |
| WO | 2008/084046 | 7/2008 |
| WO | 2010/009205 | 1/2010 |
| WO | 2018/016536 | 1/2018 |
| WO | WO-2018016536 A1 * | 1/2018 ................ C08J 9/00 |
| WO | 2019/066060 | 4/2019 |

OTHER PUBLICATIONS

Extended European Search Report dated Jul. 14, 2021 in corresponding European Patent Application No. 18876363.5.
International Search Report dated Oct. 9, 2018 in International (PCT) Application No. PCT/JP2018/025475.
Li, Yuying, "Polymer Physics and Chemistry", Chemical Industry Press, 1995, p. 175, with concise explanation, 4 pages.

* cited by examiner

*Primary Examiner* — Irina S Zemel
(74) *Attorney, Agent, or Firm* — Wenderoth, Lind & Ponack, L.L.P.

(57) ABSTRACT

The present invention aims to provide a resin foam excellent in shock absorption properties and damping properties and less likely to cause sheet misalignment. Provided is a resin foam having a multitude of cells, the resin foam containing: a polyvinyl acetal; and a plasticizer, the resin foam having a loss tangent tan δ with a peak of 0.5 or higher in the range of 0° C. to 50° C. as determined by dynamic viscoelasticity measurement at a measurement frequency of 1 Hz, and the resin foam having a 23° C. compression set of 85% or lower.

16 Claims, No Drawings

FOAMED RESIN OBJECT

TECHNICAL FIELD

The present invention relates to a resin foam excellent in shock absorption properties and damping properties and less likely to cause sheet misalignment.

BACKGROUND ART

Resin foams are light, flexible, and excellent in shock absorption properties, damping properties, and the like. Resin foams are thus used in various applications such as members for vehicles (e.g., automobiles, aircraft, and ships), members for buildings, electronic components, members for interior materials such as carpet backing materials, and electrical appliances for home and commercial uses (for example, Patent Literature 1).

In particular, resin foams having a high loss tangent tan δ are known to be excellent in shock absorption properties and damping properties.

However, the resin of resin foams having a high loss tangent tan δ easily flows. For example, when a laminate including such a resin foam and other components is leaned against something, the resin foam flows even at room temperature of about 25° C., causing misalignment of the components called "sheet misalignment".

CITATION LIST

Patent Literature

Patent Literature 1: JP 2015-52726 A

SUMMARY OF INVENTION

Technical Problem

In view of the situation in the art, the present invention aims to provide a resin foam excellent in shock absorption properties and damping properties and less likely to cause sheet misalignment.

Solution to Problem

The present invention relates to a resin foam having a multitude of cells, the resin foam containing: a polyvinyl acetal; and a plasticizer, the resin foam having a loss tangent tan δ with a peak of 0.5 or higher in the range of 0° C. to 50° C. as determined by dynamic viscoelasticity measurement at a measurement frequency of 1 Hz, and the resin foam having a 23° C. compression set of 85% or lower.

The present invention is described in detail below.

The present inventors found out that a resin foam containing a polyvinyl acetal and a plasticizer can have a loss tangent tan δ with a peak of 0.5 or higher in the range of 0° C. to 50° C. while having a 23° C. compression set of 85% or lower, and thus can combine excellent shock absorption properties and damping properties with low fluidity that leads to less sheet misalignment. The present inventors thus completed the present invention.

The resin foam of the present invention contains a polyvinyl acetal and a plasticizer.

The polyvinyl acetal may be any polyvinyl acetal obtained by acetalizing polyvinyl alcohol with an aldehyde, and is preferably polyvinyl butyral. As needed, two or more polyvinyl acetals may be used in combination.

The lower limit of the degree of acetalization of the polyvinyl acetal is preferably 40 mol % and the upper limit thereof is preferably 85 mol %. The lower limit is more preferably 60 mol % and the upper limit is more preferably 75 mol %.

The lower limit of the hydroxy group content of the polyvinyl acetal is preferably 15 mol % and the upper limit thereof is preferably 40 mol %. With the hydroxy group content within this range, the polyvinyl acetal has high compatibility with the plasticizer.

The degree of acetalization and the hydroxy group content can be measured in conformity with "Testing Methods for Polyvinyl Butyral", JIS K6728, for example.

The polyvinyl acetal can be prepared by acetalizing polyvinyl alcohol with an aldehyde.

The polyvinyl alcohol is commonly prepared by saponifying polyvinyl acetate. Polyvinyl alcohol with a degree of saponification of 70 to 99.8 mol % is normally used. The degree of saponification of the polyvinyl alcohol is preferably 80 to 99.8 mol %.

The lower limit of the degree of polymerization of the polyvinyl alcohol is preferably 500 and the upper limit thereof is preferably 4,000. When the degree of polymerization of the polyvinyl alcohol is 500 or higher, the resulting resin foam has excellent handleability. When the degree of polymerization of the polyvinyl alcohol is 4,000 or lower, formation of the resin foam is facilitated. The lower limit of the degree of polymerization of the polyvinyl alcohol is more preferably 1,000 and the upper limit thereof is more preferably 3,600.

Any aldehyde may be used. Commonly, a C1-C10 aldehyde is suitably used. Any C1-C10 aldehyde may be used. Examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. These aldehydes may be used alone or in combination of two or more thereof. Preferred among them are C2-C10 aldehydes from the standpoint of making it easy to design the resulting foam resin to have a high loss factor. More preferred are n-butyraldehyde, n-hexylaldehyde, and n-valeraldehyde, with n-butyraldehyde being particularly preferred.

Any plasticizer may be used. Examples thereof include organic ester plasticizers such as monobasic organic acid esters and polybasic organic acid esters and phosphoric acid plasticizers such as organophosphate plasticizers and organophosphite plasticizers. The plasticizer is preferably a liquid plasticizer.

Any monobasic organic acid ester may be used, and examples thereof include glycol esters obtained by a reaction between a glycol and a monobasic organic acid.

Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octylic acid, 2-ethylhexylic acid, pelargonic acid (or n-nonylic acid), and decylic acid. In particular, preferred are triethylene glycol dicaproate, triethylene glycol di-2-ethylbutyrate, triethylene glycol di-n-octylate, and triethylene glycol di-2-ethylhexylate.

Any polybasic organic acid ester may be used, and examples thereof include ester compounds of a polybasic organic acid (e.g., adipic acid, sebacic acid, and azelaic acid) and a C4-C8 linear or branched alcohol. In particular, preferred are dibutyl sebacate, dioctyl azelate, and dibutyl carbitol adipate.

Any organic ester plasticizer may be used, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, diisononyl adipate, heptylnonyl adipate, dibutyl sebacate, oil-modified sebacic alkyds, mixtures of phosphoric acid esters and adipic acid esters, adipic acid esters, mixed type adipic acid esters prepared from C4-C9 alkyl alcohols and C4-C9 cyclic alcohols, and C6-C8 adipic acid esters such as hexyl adipate.

Any organophosphate plasticizer may be used, and examples thereof include tributoxyethyl phosphate, isodecylphenyl phosphate, and triisopropyl phosphate.

For less hydrolysis, the plasticizer contains preferably triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO) or triethylene glycol di-2-ethylhexanoate (3GO), still more preferably triethylene glycol di-2-ethylhexanoate (3GO).

The amount of the plasticizer in the resin foam of the present invention is not limited. The lower limit thereof relative to 100 parts by weight of the polyvinyl acetal is preferably 5 parts by weight and the upper limit thereof is preferably 60 parts by weight. The plasticizer in an amount within this range allows the resin foam to exhibit high shock absorption properties and damping properties, and does not bleed out from the resin foam. The lower limit of the amount of the plasticizer is more preferably 20 parts by weight and the upper limit thereof is more preferably 55 parts by weight.

The resin foam of the present invention may contain, in addition to the polyvinyl acetal and the plasticizer, additives such as an adhesion modifier, a heat absorbing agent, a UV shielding agent, an antioxidant, a light stabilizer, and an antistatic agent. The resin foam may also contain a pigment such as carbon black or a dye to adjust the appearance of the resin foam.

The resin foam of the present invention is preferably crosslinked with a crosslinking agent. The crosslinked resin foam can have a lower 23° C. compression set and thus can have lower fluidity at room temperature.

The crosslinking agent may be any compound that can react with a hydroxy group, an acetyl group, an acetal group, or the like contained in a side chain of the polyvinyl acetal to crosslink polyvinyl acetal molecules. Specific examples of the crosslinking agent include epoxy compounds, isocyanate compounds, and boric acid compounds. Alternatively, for example, the crosslinking agent may be a polyfunctional (meth)acrylate compound such as trimethylol propane triacrylate (TMPTA).

When a polyfunctional (meth)acrylate compound is used as the crosslinking agent, a photopolymerization initiator is preferably used in combination. Using a polyfunctional (meth)acrylate compound in combination with a photopolymerization initiator enables uniform and reliable crosslinking of the resin foam.

The photopolymerization initiator may be a conventionally known compound such as benzophenone.

The resin foam of the present invention has a loss tangent tan δ with a peak of 0.5 or higher in the range of 0° C. to 50° C. as determined by dynamic viscoelasticity measurement at a measurement frequency of 1 Hz, and has a 23° C. compression set of 85% or lower.

The loss tangent tan δ is the ratio of the loss shear modulus (G") to the storage shear modulus (G') (G"/G'), and indicates how much energy is absorbed (converted to heat) by a material when the material is deformed. With the loss tangent tan δ with a peak of 0.5 or higher in the range of 0° C. to 50° C., the resin foam of the present invention can exhibit excellent shock absorption properties and damping properties. The resin foam preferably has a loss tangent tan δ with a peak of 0.7 or higher in the range of 0° C. to 50° C.

In the resin foam of the present invention, a temperature range over which the loss tangent tan δ is 0.4 or higher is preferably at least 25° C. as determined by dynamic viscoelasticity measurement at a measurement frequency of 1 Hz. This allows the resin foam to exhibit better shock absorption properties and damping properties.

The 23° C. compression set as used herein means "residual strain" of a specimen caused by compressing the specimen by a predetermined percentage with compression plates and holding the specimen in an environment at 23° C. for a predetermined time. With the 23° C. compression set of 85% or lower, the resin foam of the present invention exhibits reduced fluidity at room temperature, and thus can prevent sheet misalignment even when, for example, a laminate including the resin foam and other components is leaned against something. The 23° C. compression set is preferably 50% or lower. The lower limit of the 23° C. compression set is not limited, but is practically about 5%.

The 23° C. compression set can be measured by a method in conformity with JIS K 6262.

The above loss tangent tan δ and 23° C. compression set can be achieved by adjusting the foam state of the resin foam. Specifically, for example, the open cell ratio of the resin foam is preferably 20% or higher. An open cell ratio of 20% or higher enables adjustment of the loss tangent tan δ and 23° C. compression set of the resulting resin foam within predetermined ranges, so that the resin foam can combine excellent shock absorption properties and damping properties with low fluidity at room temperature. The open cell ratio is more preferably 25% or higher, still more preferably 30% or higher, particularly preferably 50% or higher. The upper limit of the open cell ratio is not limited, but is practically about 98%.

The open cell as used herein refers to cells connected to each other in the resin foam.

The open cell ratio is defined as the volumetric ratio of open cells connected to the outside of the resin foam relative to the apparent volume of the resin foam determined by size measurement, and can be determined by pycnometry described in JIS K 7138 or the like.

The lower limit of the average cell size of the resin foam of the present invention is preferably 100 μm and the upper limit thereof is preferably 1,000 μm. With the average cell size within this range, the resin foam can exhibit better shock absorption properties and damping properties and lower fluidity. The lower limit of the average cell size is more preferably 120 μm and the upper limit thereof is more preferably 500 μm. The lower limit is still more preferably 200 μm.

The average cell size can be determined by observing cell walls and void spaces in a cross-sectional photograph of cells and measuring the sizes of the void spaces.

The resin foam of the present invention preferably has an average aspect ratio of cells of 2 or less. When the average aspect ratio of cells is 2 or less, the resin foam can exhibit better shock absorption properties and damping properties and lower fluidity. The average aspect ratio of cells is more preferably 1.5 or less.

The average aspect ratio of cells can be determined by measuring the major axis and minor axis of each void space in a cross-sectional photograph of cells and calculating the ratio of the axes.

The resin foam of the present invention preferably has an apparent density of 300 kg/m$^3$ or less. When the apparent density is 300 kg/m$^3$ or less, the foam resin can exhibit better shock absorption properties and damping properties and lower fluidity. The apparent density is more preferably 200 kg/m$^3$ or less. The lower limit of the apparent density is not limited, but is practically about 50 kg/m$^3$.

The resin foam of the present invention may be produced by any method. It is preferably produced by a method of blending the polyvinyl acetal, the plasticizer, and additives according to needs with a heat-decomposable foaming agent to prepare a resin composition and then heating the resin composition to a foaming temperature to decompose the heat-decomposable foaming agent. When the resin foam of the present invention is crosslinked, the crosslinking agent described above is added to the resin composition.

For adjusting the open cell ratio to 20% or higher and adjusting the loss tangent tan δ and 23° C. compression set to predetermined ranges to combine excellent shock absorption properties and damping properties with low fluidity at room temperature, it is significantly important to appropriately set the type and amount of the heat-decomposable foaming agent and the foaming temperature in production of the resin foam. In particular, setting of the foaming temperature is essential to achieve the high open cell ratio.

The foaming temperature is preferably 180° C. or higher. When the foaming temperature is 180° C. or higher, the resin composition upon foaming is sufficiently softened to facilitate communication between cells, presumably facilitating generation of open cells. An increase in the open cell ratio along with an increase in the foaming temperature seems to be a phenomenon peculiar to a resin composition containing a polyvinyl acetal and a plasticizer because such phenomenon is not observed in the case of a resin composition containing a resin other than polyvinyl acetal.

The heat-decomposable foaming agent may be any conventionally known foaming agent having a decomposition temperature of about 120° C. to 240° C. For a higher open cell ratio, when the foaming temperature is set at 180° C. or higher, the heat-decomposable foaming agent is preferably selected such that the foaming temperature is higher than the decomposition temperature of the heat-decomposable foaming agent. Specifically, the foaming temperature is preferably higher than the decomposition temperature of the heat-decomposable by 20° C. or more, more preferably by 50° C. or more, still more preferably 80° C. or more.

For a higher open cell ratio, the heat-decomposable foaming agent preferably has a decomposition temperature higher by 20° C. or more, more preferably by 50° C. or more, than the molding temperature of the resin composition as a raw material before foaming.

Specific examples of the heat-decomposable foaming agent include azodicarbonamide, N,N'-dinitrosopentamethylenetetramine, 4,4'-oxybis(benzenesulfonylhydrazide), urea, sodium hydrogen carbonate, and mixtures of these.

Examples of commercial products of the heat-decomposable foaming agent include CELLMIC series (available from Sankyo Kasei Co., Ltd.) and VINYFOR series, CELLULAR series, and NEOCELLBORN series (available from Eiwa Chemical Ind. Co., Ltd.).

The amount of the heat-decomposable foaming agent in the resin composition is not limited. The lower limit of the amount of the heat-decomposable foaming agent is preferably 2 parts by weight and the upper limit thereof is preferably 20 parts by weight, relative to 100 parts by weight of the polyvinyl acetal. With the amount of the heat-decomposable foaming agent within this range, the foam having an open cell ratio of 10% or higher can be produced. The lower limit of the amount of the heat-decomposable foaming agent is more preferably 5 parts by weight and the upper limit thereof is more preferably 15 parts by weight.

The resin foam of the present invention has the structure described above, and thus can combine excellent shock absorption properties and damping properties with low fluidity at room temperature. The resin foam of the present invention thus can be used in various applications such as members for vehicles (e.g., automobiles, aircraft, and ships), members for buildings, electronic components, members for interior materials such as carpet backing materials, and electrical appliances for home and commercial uses.

Advantageous Effects of Invention

The present invention can provide a resin foam excellent in shock absorption properties and damping properties and less likely to cause sheet misalignment.

DESCRIPTION OF EMBODIMENTS

Embodiments of the present invention are more specifically described in the following with reference to, but not limited to, examples.

Example 1

(1) Production of Resin Foam

To 100 parts by weight of polyvinyl butyral (PVB) were added 40 parts by weight of 3GO, 7 parts by weight of CELLMIC AN (available from Sankyo Kasei Co., Ltd., decomposition temperature: 125° C.), 2 parts by weight of TMPTA (available from Kyoei Kagaku Kogyo), and 0.4 parts by weight of benzophenone, whereby a resin composition was obtained. The obtained resin composition was sufficiently kneaded at 110° C. in a mixing roll and then extruded through an extruder into a sheet having a thickness of 1 mm. The PVB had a hydroxy group content of 34.5 mol %, a degree of acetylation of 0.8 mol %, a degree of butyralization of 64.7 mol %, and average degree of polymerization of 1,700.

Each surface of the obtained sheet was irradiated with ultraviolet light at 1,500 mJ/cm$^2$ (365 nm) using a high pressure mercury lamp (available from Toshiba Lighting & Technology Corporation, TOSCURE 401), whereby benzophenone was activated to cause crosslinking. The sheet was then put in an oven and the heat-decomposable foaming agent was decomposed at a foaming temperature of 220° C., whereby a resin foam was obtained.

(2) Measurement of Open Cell Ratio and Apparent Density

The open cell ratio of the obtained resin foam was measured by pycnometry in conformity with JIS K 7138. The apparent density was obtained by calculation based on the measured weight and the apparent volume obtained from size measurement.

(3) Measurement of Loss Tangent Tan δ

A foam sample having a thickness of 4 mm was formed, and a piece having a diameter of 2.5 cm was cut out of the sample. The piece was subjected to measurement at varying temperatures with a dynamic viscoelasticity measuring apparatus (ARES-G2, available from TA Instruments) to determine the loss tangent tan δ. The measurement was performed under the conditions of a measurement strain of 1%, a measurement frequency of 1 Hz, and a measurement temperature of −10° C. to 70° C.

(4) Measurement of 23° C. Compression Set

The 23° C. compression set was measured by a method in conformity with JIS K 6262.

Specifically, circular samples having a diameter of 29 mm were cut out and stacked to a thickness of about 12.5 mm. The obtained stack sample was interposed between two parallel flat plates, compressed by 25% of the initial thickness of the sample, and left to stand under standard conditions (23° C. and 50% RH) for 22 hours. The sample was then taken out of the flat plates, left to stand at standard conditions for 30 minutes, and then the thickness was measured again. The compression set was determined by the following equation.

Compression set=(Initial thickness−Thickness after test)/(Initial thickness−Compressed thickness)× 100

Examples 2 to 9

A resin foaming agent was produced and the loss tangent tan δ, the 23° C. compression set, and other properties were measured as in Example 1 except that the amounts of the heat-decomposable foaming agent, the crosslinking agent, and the photopolymerization initiator were as shown in Table 1.

Comparative Example 1

A commercially available polyethylene foam (available from Sekisui Chemical Co., Ltd., Softlon S, expansion ratio: 30 times) was provided as a comparative example. The loss tangent tan δ, the 23° C. compression set, and other properties of the polyethylene foam were measured as in Example 1.

Comparative Example 2

A commercially available ethylene-vinyl acetate copolymer (EVA) foam (available from Mitsufuku Industry Co., Ltd., MITSUFUKU FOAM V15, expansion ratio: 12 times) was provided as a comparative example. The loss tangent tan δ, the 23° C. compression set, and other properties of the EVA foam were measured as in Example 1.

(Evaluation)

The resin foams obtained in the examples and comparative examples were evaluated as follows.

Table 1 shows the results.

(1) Evaluation of Shock Absorption Properties (Hammer Test)

A sheet having a thickness of 4 mm formed from the obtained resin foam was used as a sample. This sample was interposed between two polycarbonate (PC) sheets each having a thickness of 2 mm to give a stack. The stack was compressed until the thickness of the resin foam was reduced to 3.6 mm (reduced by 10%). The stack was left to stand in this state for one month at 25° C.

The stack after standing was taken out, and one surface of the stack was hit with a hammer. The magnitude of shock (maximum acceleration) at the front surface (surface hit with a hammer) and the back surface was measured. The magnitude of shock (%) at the back surface was calculated, with the magnitude of shock at the surface hit with a hammer taken as 100%.

(2) Evaluation of Fluidity (Sheet Misalignment Test)

The sample was interposed between PC sheets at 10% compression and left to stand for one month in the same manner as above. The stack was then positioned vertically, and hit with a hammer from one side at a shock value (maximum acceleration) of 1,000 m/s$^2$. Whether sheet misalignment due to movement of the resin foam occurred was observed. The fluidity was evaluated according to the following criteria.

○ (Good): No sheet misalignment was observed.

x (Poor): Sheet misalignment occurred.

TABLE 1

| | | | | Example 1 | Example 2 | Example 3 | Example 4 | Example 5 | Example 6 |
|---|---|---|---|---|---|---|---|---|---|
| Resin composition | Thermoplastic resin | Type | — | PVB | PVB | PVB | PVB | PVB | PVB |
| | | Amount | Parts by weight | 100 | 100 | 100 | 100 | 100 | 100 |
| | Plasticizer | Type | — | 3GO | 3GO | 3GO | 3GO | 3GO | 3GO |
| | | Amount | Parts by weight | 40 | 40 | 40 | 40 | 40 | 40 |
| | Foaming agent | Type | — | CELLMIC AN | CELLMIC AN | CELLMIC AN | CELLMIC AN | CELLMIC AN | CELLMIC AN |
| | | Amount | Parts by weight | 7 | 10 | 15 | 2 | 7 | 7 |
| | Crosslinking agent | Type | — | TMPTA | TMPTA | TMPTA | TMPTA | TMPTA | TMPTA |
| | | Amount | Parts by weight | 2 | 2 | 2 | 2 | 0.5 | 5 |
| | Photo-polymerization initiator | Type | — | Benzo-phenone | Benzo-phenone | Benzo-phenone | Benzo-phenone | Benzo-phenone | Benzo-phenone |
| | | Amount | Parts by weight | 0.4 | 0.4 | 0.4 | 4 | 0.4 | 0.4 |
| Resin foam | Open cell ratio | | % | 67 | 88 | 90 | 12 | 65 | 15 |
| | Apparent density | | kg/m$^3$ | 170 | 130 | 110 | 500 | 140 | 250 |
| | Loss tangent tan δ | Peak | — | 0.98 | 0.95 | 0.98 | 0.95 | 0.93 | 0.83 |
| | | Temperature range over which tan δ is 0.4 or higher | ° C. | 40 | 42 | 45 | 40 | 45 | 40 |
| | 23° C. compression set | | % | 18 | 20 | 22 | 45 | 52 | 20 |

TABLE 1-continued

| Evaluation | Shock absorption (Hammer test) | % | 52 | 45 | 40 | 60 | 35 | 55 |
|---|---|---|---|---|---|---|---|---|
| | Fluidity evaluation (Sheet misalignment test) | — | ○ | ○ | ○ | ○ | ○ | ○ |

| | | | | Example 7 | Example 8 | Example 9 | Comparative Example 1 | Comparative Example 2 |
|---|---|---|---|---|---|---|---|---|
| Resin composition | Thermoplastic resin | Type | — | PVB | PVB | PVB | Polyethylene foam | EVA foam |
| | | Amount | Parts by weight | 100 | 100 | 100 | | |
| | Plasticizer | Type | — | 3GO | 3GO | 3GO | | |
| | | Amount | Parts by weight | 40 | 40 | 40 | | |
| | Foaming agent | Type | — | CELLMIC AN | CELLMIC AN | CELLMIC AN | | |
| | | Amount | Parts by weight | 15 | 7 | 10 | | |
| | Crosslinking agent | Type | — | TMPTA | | | | |
| | | Amount | Parts by weight | 0.5 | | | | |
| | Photo-polymerization initiator | Type | — | Benzophenone | | | | |
| | | Amount | Parts by weight | 0.4 | | | | |
| Resin foam | Open cell ratio | | % | 88 | 87 | 90 | <2 | <2 |
| | Apparent density | | kg/m³ | 100 | 140 | 110 | 30 | 80 |
| | Loss tangent tanδ | Peak | — | 0.95 | 0.98 | 0.92 | 0.35 | 0.32 |
| | | Temperature range over which tanδ is 0.4 or higher | °C. | 47 | 50 | 45 | 0 | 0 |
| | 23° C. compression set | | % | 38 | 73 | 67 | 98 | 97 |
| Evaluation | Shock absorption (Hammer test) | | % | 35 | 38 | 40 | 105 | 98 |
| | Fluidity evaluation (Sheet misalignment test) | | — | ○ | ○ | ○ | x | x |

INDUSTRIAL APPLICABILITY

The present invention can provide a resin foam excellent in shock absorption properties and damping properties and less likely to cause sheet misalignment.

The invention claimed is:

1. A resin foam having a multitude of cells,
the resin foam comprising:
a polyvinyl acetal; and
a plasticizer,
the resin foam having an open cell ratio of 20% or higher, and the open cell ratio being defined as the volumetric ratio of cells connected to the outside of the resin foam relative to the apparent volume of the resin foam determined by size measurement, and
the resin foam having a loss tangent tan δ with a peak of 0.5 or higher in the range of 0° C. to 50° C. as determined by dynamic viscoelasticity measurement at a measurement frequency of 1 Hz, and
the resin foam having a 23° C. compression set of 85% or lower.

2. The resin foam according to claim 1,
wherein the resin foam has a loss tangent tan δ with a peak of 0.7 or higher in the range of 0° C. to 50° C. as determined by dynamic viscoelasticity measurement at a measurement frequency of 1 Hz.

3. The resin foam according to claim 1,
wherein a temperature range over which the loss tangent tan δ is 0.4 or higher is at least 25° C. as determined by dynamic viscoelasticity measurement at a measurement frequency of 1 Hz.

4. The resin foam according to claim 1,
wherein the 23° C. compression set is 50% or lower.

5. The resin foam according to claim 1, crosslinked with a crosslinking agent.

6. The resin foam according to claim 2,
wherein a temperature range over which the loss tangent tan δ is 0.4 or higher is at least 25° C. as determined by dynamic viscoelasticity measurement at a measurement frequency of 1 Hz.

7. The resin foam according to claim 2,
wherein the 23° C. compression set is 50% or lower.

8. The resin foam according to claim 3,
wherein the 23° C. compression set is 50% or lower.

9. The resin foam according to claim 6,
wherein the 23° C. compression set is 50% or lower.

10. The resin foam according to claim 2, crosslinked with a crosslinking agent.

11. The resin foam according to claim 3, crosslinked with a crosslinking agent.

12. The resin foam according to claim 6, crosslinked with a crosslinking agent.

13. The resin foam according to claim 4, crosslinked with a crosslinking agent.

14. The resin foam according to claim 7, crosslinked with a crosslinking agent.

15. The resin foam according to claim 8, crosslinked with a crosslinking agent.

16. The resin foam according to claim 9, crosslinked with a crosslinking agent.

* * * * *